United States Patent [19]
Wreede et al.

[11] Patent Number: 5,455,693
[45] Date of Patent: Oct. 3, 1995

[54] DISPLAY HOLOGRAM

[75] Inventors: John E. Wreede, Azusa; James E. Scott, Hermosa Beach, both of Calif.

[73] Assignee: Hughes Aircraft Company, Los Angeles, Calif.

[21] Appl. No.: 298,532

[22] Filed: Aug. 29, 1994

Related U.S. Application Data

[63] Continuation of Ser. No. 949,948, Sep. 24, 1992, abandoned.

[51] Int. Cl.⁶ ............................ G02B 5/32; G03H 1/22
[52] U.S. Cl. ........................... 359/15; 359/32; 359/34
[58] Field of Search .................... 359/13, 14, 15, 359/22, 32, 34

[56] References Cited

U.S. PATENT DOCUMENTS

| | | | |
|---|---|---|---|
| 3,674,336 | 7/1972 | Kogelnik | 359/34 |
| 3,885,856 | 5/1975 | Ostrowsky et al. | 359/34 |
| 4,400,616 | 8/1983 | Chevillat et al. | 359/34 |
| 4,711,512 | 12/1987 | Upatnieks | 359/15 |
| 5,151,800 | 9/1992 | Upatnieks | 359/34 |
| 5,224,198 | 6/1993 | Jachinowicz et al. | 359/13 |
| 5,243,449 | 7/1993 | Smith | 359/13 |

FOREIGN PATENT DOCUMENTS

| | | | |
|---|---|---|---|
| 57-142608 | 9/1982 | Japan | 359/34 |
| 59-53805 | 3/1984 | Japan | 359/34 |

*Primary Examiner*—Martin Lerner
*Attorney, Agent, or Firm*—Leonard A. Alkov; W. K. Denson-Low

[57] ABSTRACT

A display hologram structure including a display hologram configured for reconstruction with a playback beam having a predetermined wavefront configuration, and a light configuring hologram that provides playback illumination for the display hologram pursuant to diffraction of an off-axis playback beam that does not have the predetermined wavefront configuration, and wherein the playback illumination provided by the light configuring hologram has the predetermined wavefront configuration.

19 Claims, 6 Drawing Sheets

DISPLAY HOLOGRAM

This is a continuation of application Ser. No. 07/949,948 filed Sep. 24, 1992, now abandoned.

BACKGROUND OF THE INVENTION

The disclosed invention is directed generally to display holograms, and more particularly to a display hologram structure that includes a display hologram which is optimally illuminated with a playback beam that is provided by another hologram.

Display holograms that produce pictorial images viewable by an observer have a variety of uses including vehicle instrumentation displays, pictorial displays in museums and homes, advertising displays, toys, and games, for example.

A consideration with display holograms, and holograms in general, is that they perform best when the playback illumination has the same wavefront configuration (i.e., incidence angle and angle of divergence) as the reference beam utilized for construction of the particular hologram. However, the particular application of a display hologram can make it impractical to utilize a source of playback illumination that provides the appropriate wavefront configuration. For example, an optimum pictorial hologram for a particular application might be constructed with a collimated reference beam, but the intended playback source is a point filament of a bulb. Another example is the intended playback with a converging beam of a hologram that was constructed with a diverging reference beam, for example to produce a special effect such as a pseudoscopic image. Use of a lens or mirror to produce a converging beam of a large size involves space and cost.

Pictorial holograms that are constructed with a reference beam that is near normal to the hologram recording medium (e.g., a diverging beam whose central ray is near normal), for example to reduce shadow effects or to otherwise provide a better beam for reconstruction with a given light source, provide another example the difficulty in providing a playback illumination source that produces the appropriate wavefront configuration. For such holograms, the appropriate playback wavefront would be near normal to the hologram, and the observer's head would be in the playback illumination path for a reflection hologram, and a less than optimal playback wavefront configuration would typically be utilized. For a transmission hologram configured for a near normal playback wavefront, the light source would have to be located behind the hologram, which might not be feasible in a given application, for example if the hologram is intended to be supported on a wall.

SUMMARY OF THE INVENTION

It would therefore be an advantage to provide a display hologram structure that provides for optimal playback illumination of a display hologram.

Another advantage would be to provide a display hologram structure that provides for optimal playback illumination of a display hologram for a playback illumination source that does not produce illumination having the same wavefront as the construction reference beam.

The foregoing and other advantages are provided by the invention in a hologram structure that includes a display hologram configured for reconstruction with a playback beam incident thereon at a predetermined angle near normal thereto, and a light bending hologram configured to diffract an off-axis playback beam to produce a diffracted output that is incident on the display hologram at substantially said predetermined angle. More particularly, the off-axis playback beam can be a trapped beam travelling in a substrate, wherein the trapped beam is coupled into the substrate by a light coupling hologram, a prism, or the edge of the substrate.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

In accordance with the invention, a light configuring hologram diffracts an off-axis playback beam to produce playback illumination with the appropriate wavefront configuration for a display hologram. The playback beam incident on the light configuring hologram is "off-axis" in the sense that such playback beam is not of the appropriate wavefront configuration for optimum playback of the display hologram.

Figure 1:
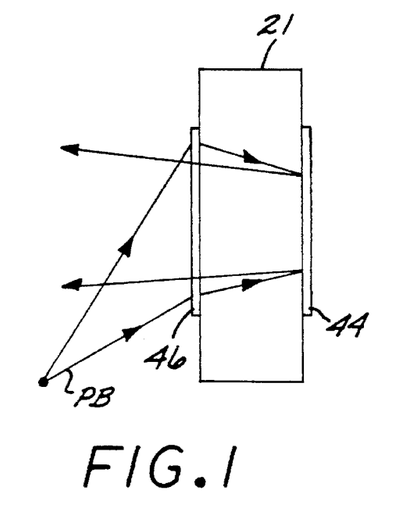
FIG. 1 is a schematic sectional elevational view illustrating an embodiment of the invention that includes a display reflection hologram and a light bending transmission hologram that is illuminated with an off-axis diverging beam.

Referring now to FIG. 1, set forth therein by way of illustrative example is a hologram structure in accordance with the invention. A display reflection hologram 44 is supported on the non-viewing side of a substrate 21 and receives playback illumination from a light configuring transmission hologram 46 that is supported on the viewing side of the substrate 21 opposite the display hologram 44. The light configuring hologram 46 receives a diverging playback beam PB incident thereon at a relatively large angle relative to normal and which it diffracts to produce a converging playback beam for the display hologram 44 which is incident on the display hologram at an angle that is near normal thereto (for example within 25 degrees of normal).

As exemplified by the hologram structure of FIG. 1, the subject invention is generally directed to a hologram structure that includes a display hologram for producing a hologram image, which is viewable by an observer, pursuant to a playback beam that has the appropriate or desired wavefront configuration (i.e., incidence angle and angle of divergence), for playback of the display hologram. The display hologram is supported on a substrate that includes a viewing side and an opposite non-viewing side, and receives playback illumination from a light configuring hologram that is also supported by the substrate and is illuminated with an off-axis playback beam, where "off-axis" indicates that the playback beam incident on the light configuring hologram does not have the appropriate or desired wavefront configuration for playback of the display hologram. The off-axis playback beam for the light configuring hologram can comprise a diverging beam as shown in FIG. 1 such as would be produced by the filament of a bulb, a collimated beam, or a trapped beam. A trapped playback beam can be coupled into the hologram supporting substrate by a light coupling hologram or by edge coupling as discussed further herein. Also, the hologram structure can be configured for a single bounce trapped beam wherein the off-axis beam illuminates the light configuring hologram only, or it can configured for a multiple bounce trapped beam wherein the off-axis beam illuminates the light bend hologram pursuant to a series of internal reflections. The viewing side and the non-viewing side of the hologram supporting substrate can be parallel to each other, for example as in a planar substrate, or they can be non-parallel to each other, depending upon implementation and application. The thickness of the hologram supporting substrate can be in the range of about 0.010 inches to 0.5 inches, depending upon the particular implementation and application. For example, the substrate can be relatively thin (e.g., 0.010 to 0.125 inches) for a non-trapped beam implementation, or it can be relatively thick (e.g., 0.25 to 0.5 inches) for an edge coupled, trapped beam implementation.

The display hologram can be a reflection hologram (as shown in FIG. 1) or a transmission hologram (shown in further figures), and the light configuring hologram can be a transmission hologram (as shown in FIG. 1) or a reflection hologram. Depending upon the particular mechanism by which the off-axis playback beam is provided to the light configuring hologram and depending upon the particular hologram types (transmission or reflection) utilized to implement the display hologram and the associated light configuring hologram, the display hologram and the light configuring hologram can be supported on opposite sides of the hologram supporting substrate, or they can be supported in laminar fashion on the same side of the substrate. It should be appreciated that to the extent that the display hologram and the light configuring hologram are supported in laminar fashion on the same side of the hologram supporting substrate, the holograms are secured to each other in laminar fashion in accordance with conventional techniques, with or without one or more intervening thin substrate layers, depending upon implementation. In the figures, embodiments wherein the display hologram and the light configuring hologram are supported in a layered manner on the same side of the substrate, such holograms are schematically shown spaced apart to allow for depiction of the diffracted light rays.

Figure 2:
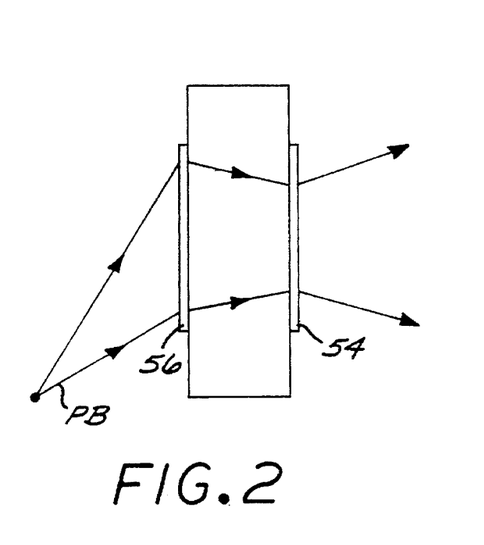
FIG. 2 is a schematic sectional elevational view illustrating an embodiment of the invention that includes a display transmission hologram and a light bending transmission hologram that is illuminated with an off-axis diverging beam.

FIG. 2 sets forth a hologram structure in accordance with the invention that includes a substrate 21, a display transmission hologram 54 disposed on the viewing side of the substrate 21, and a transmission light configuring hologram 56 disposed on the non-viewing side of the substrate opposite the display hologram 54. The light configuring hologram 56 produces a converging playback beam for the display hologram 54 pursuant to diffraction of an off-axis diverging playback beam PB that is incident thereon at an angle that is relatively large relative to normal. The converging playback beam for the display hologram 54 is incident thereon at an angle that is near normal, for example.

Figure 3:
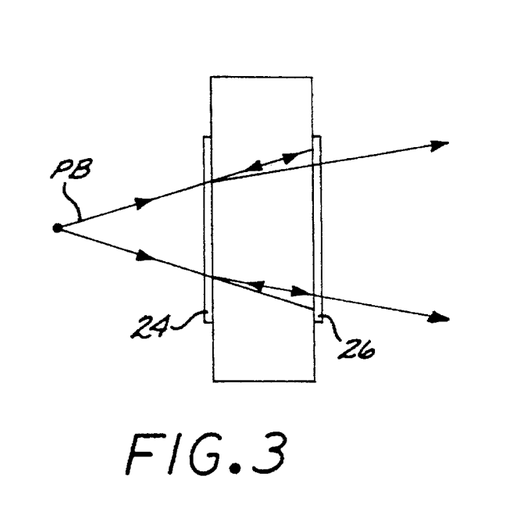
FIG. 3 is a schematic sectional elevational view illustrating an embodiment of the invention that includes a display reflection hologram and a light bending reflection hologram that is illuminated with an off-axis diverging beam.

FIG. 3 sets forth a hologram structure in accordance with the invention that includes a substrate 21, a display reflection hologram 24 supported on the non-viewing side of the substrate 21, and a light configuring reflection hologram 26 that is supported on the viewing side of the substrate 21 opposite the display hologram 24. The light configuring hologram 26 receives an off-axis diverging playback beam PB that passes through the display hologram 24 and the substrate 21, and diffracts such playback beam to produce a converging playback beam for the display reflection hologram 24.

Figure 4:
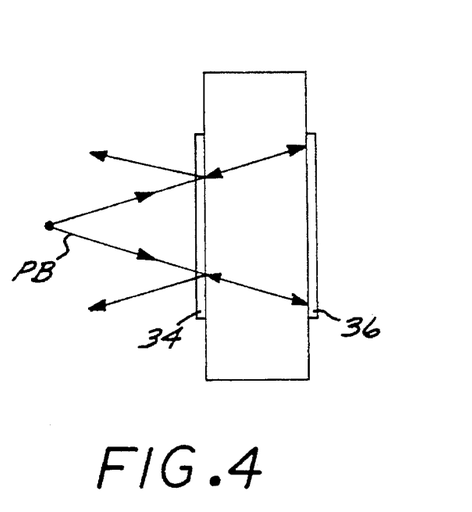
FIG. 4 is a schematic sectional elevational view illustrating an embodiment of the invention that includes a display transmission hologram and a light bending reflection hologram that is illuminated with an off-axis diverging beam.

FIG. 4 sets forth a hologram structure in accordance with the invention that includes a substrate 21, a display transmission hologram 34 disposed on the viewing side of the substrate 21, and a reflection light configuring hologram 36 disposed on the non-viewing side of the substrate opposite the display hologram 34. The light configuring hologram 56 produces a converging playback beam for the display hologram 34 pursuant to diffraction of an off-axis diverging playback beam PB that passes through the display hologram 34 and the substrate, and is incident on the reflection light configuring hologram at an angle that is relatively large relative to normal. The converging playback beam for the display hologram 54 is incident thereon at an angle that is near normal, for example.

Figure 5:
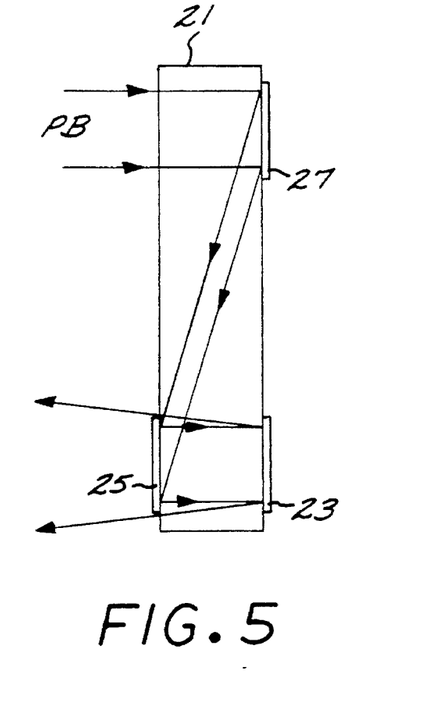
FIG. 5 is a schematic sectional elevational view illustrating an embodiment of the invention that includes a display reflection hologram, a light bending reflection hologram, and a light coupling reflection hologram.

FIG. 5 sets forth a hologram structure in accordance with the invention that includes a substrate 21, a display reflection hologram 23 supported on the non-viewing side of the substrate 21, and a light configuring reflection hologram 25 supported on the viewing side of the substrate 21 opposite the display hologram 23. The light configuring hologram 25 receives an off-axis trapped playback beam from a light coupling reflection hologram 27 that is disposed on the non-viewing side of the substrate 21 and offset relative to the display reflection hologram. The light coupling hologram receives playback illumination PB that, for example passes through the substrate 21 and is incident on the substrate side of the light coupling hologram 27 at near normal thereto.

The display hologram 23 is configured to produce a diffracted output having a diffraction angle that is near normal in response to playback illumination that is incident thereon at a reconstruction angle that is near normal, and the light configuring hologram 25 and the light coupling hologram 27 are configured so that the playback illumination PB as received by the light coupling hologram 27 is redirected by a series of diffractions to be incident on the display hologram 23 at substantially the reconstruction angle thereof. In particular, the light configuring hologram 25 is configured to respond to an off-axis trapped playback beam to provide a diffracted output that is at the reconstruction angle of the display hologram. The light coupling hologram 27, in turn, is configured to respond to a playback beam incident thereon at an angle near normal to provide a diffracted output that comprises the off-axis trapped playback beam for the light configuring hologram 25.

Figure 6:
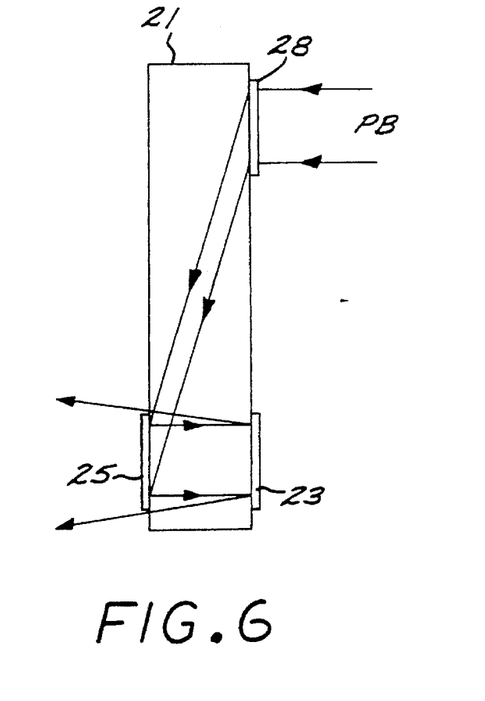
FIG. 6 is a schematic sectional elevational view illustrating an embodiment of the invention that includes a display reflection hologram, a light bending reflection hologram, and a light coupling transmission hologram.

FIG. 6 sets forth a hologram structure in accordance with the invention that includes the display reflection hologram 23 and the light configuring reflection hologram 25 of the structure of FIG. 5, and a light coupling transmission hologram 28 that diffracts a playback beam PB incident on the non-substrate side thereof at an angle that is near normal, for example, to produce the trapped off-axis playback beam for the light configuring hologram 25.

Figure 7:
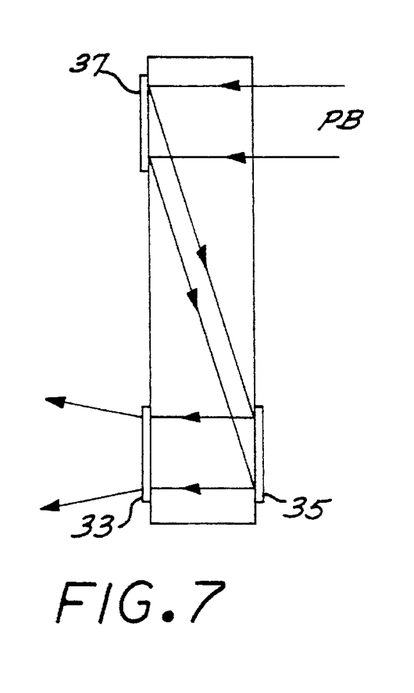
FIG. 7 is a schematic sectional elevational view illustrating an embodiment of the invention that includes a display transmission hologram, a light bending reflection hologram, and a light coupling reflection hologram.

FIG. 7 sets forth a hologram structure in accordance with the invention that includes a substrate 21, a display transmission hologram 33 disposed on the viewing side of the substrate and receives playback illumination from a light configuring reflection hologram 35 that is supported on the non-viewing side of the substrate 21 opposite the display hologram 33. The light configuring hologram 35 receives playback illumination from a light coupling reflection hologram 37 that is disposed on the viewing side of the substrate 21 and offset relative to the display transmission hologram 35. The light coupling hologram 37 diffracts a playback beam PB to produce an off-axis diffracted output that travels in the substrate to the light configuring hologram 35 which in turn diffracts the off-axis beam to produce a playback beam for the display hologram 33 that is incident thereon at a near normal angle, for example.

Figure 8:
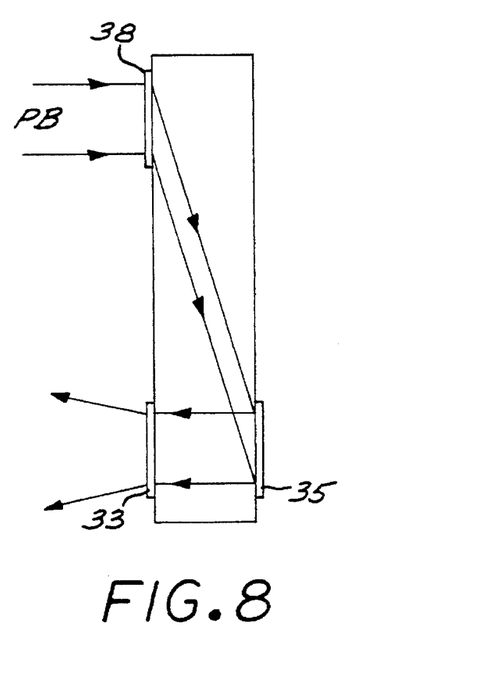
FIG. 8 is a schematic sectional elevational view illustrating an embodiment of the invention that includes a display transmission hologram, a light bending reflection hologram, and a light coupling transmission hologram.

FIG. 8 sets forth a hologram structure in accordance with the invention that includes the display transmission hologram 33 and the light configuring reflection hologram 35 of the structure of FIG. 7, and a light coupling transmission hologram 38 that diffracts a playback beam PB incident on the non-substrate side thereof at an angle that is near normal, for example, to produce a trapped off-axis playback beam for the light configuring hologram 25.

Figure 9:
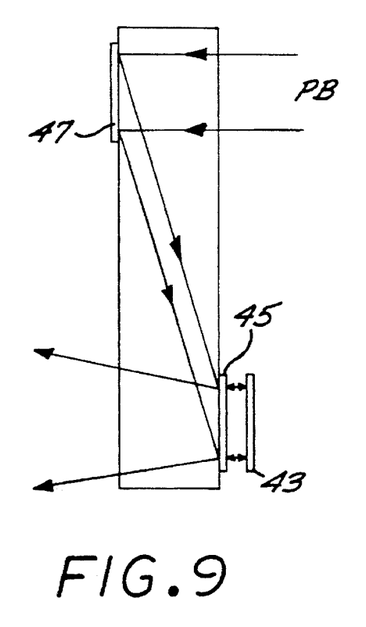
FIG. 9 is a schematic sectional elevational view illustrating an embodiment of the invention that includes a display reflection hologram, a light bending transmission hologram, and a light coupling reflection hologram.

FIG. 9 sets forth a hologram structure in accordance with the invention that includes a substrate 21, a light configuring transmission hologram 45 that is supported on the non-viewing side of the substrate 21 and provides the playback beam for a display reflection hologram 43 disposed on the light configuring transmission hologram 45. The light configuring transmission hologram 45 and the display reflection hologram are secured to each other in laminar fashion. The light configuring hologram 45 receives playback illumination from a light coupling reflection hologram 47 that is disposed on the viewing side of the substrate 21 and offset relative to the light configuring hologram 45 and the display reflection hologram 43. The light coupling hologram 47 diffracts a playback beam PB to produce an off-axis diffracted output that travels in the substrate 21 to the light configuring hologram 45 which in turn diffracts the off-axis beam to produce a playback beam for the display hologram 43 that is incident thereon at a near normal angle, for example.

Figure 10:
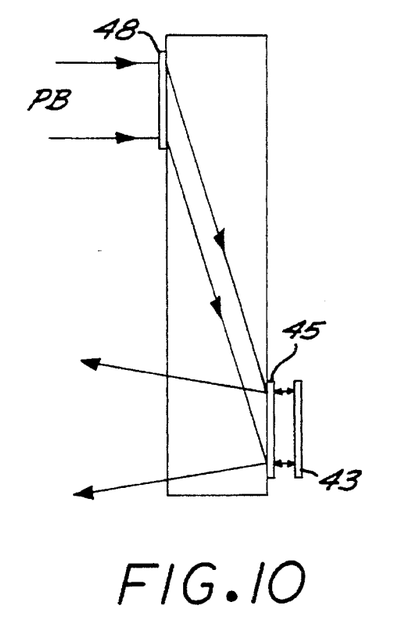
FIG. 10 is a schematic sectional elevational view illustrating an embodiment of the invention that includes a display reflection hologram, a light bending transmission hologram, and a light coupling transmission hologram.

FIG. 10 sets forth a hologram structure in accordance with the invention that includes the display reflection hologram 43 and the light configuring transmission hologram 45 of the structure of FIG. 9, and a light coupling transmission hologram 48 that diffracts a playback beam PB incident on the non-substrate side thereof at an angle that is near normal, for example, to produce a trapped off-axis playback beam for the light configuring hologram 45.

Figure 11:
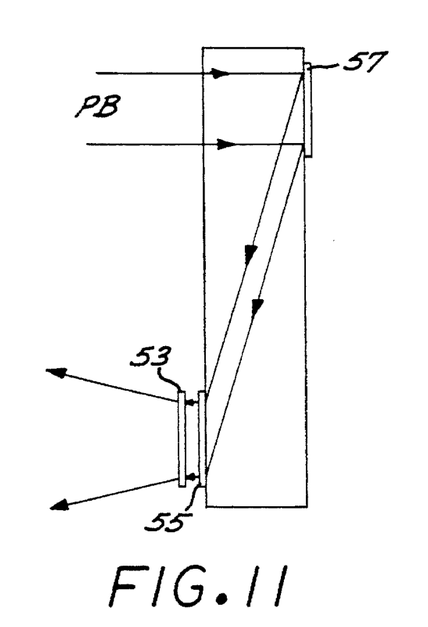
FIG. 11 is a schematic sectional elevational view illustrating an embodiment of the invention that includes a display transmission hologram, a light bending transmission hologram, and a light coupling reflection hologram.

FIG. 11 sets forth a hologram structure in accordance with the invention that includes a substrate 21, a light configuring transmission hologram 55 that is supported on the viewing side of the substrate 21 and provides the playback beam for a display transmission hologram 53 that is attached to the light configuring transmission hologram 55 in a layered manner. The light configuring hologram 55 receives playback illumination from a light coupling reflection hologram 57 that is disposed on the non-viewing side of the substrate 21 and offset relative to the laminar structure comprised of the light configuring hologram 55 and the display reflection hologram 53. The light coupling reflection hologram 57 diffracts a playback beam PB to produce an off-axis diffracted output that travels in the substrate to the light configuring transmission hologram 55 which in turn diffracts the off-axis beam to produce a playback beam for the display hologram 53 that is incident thereon at a near normal angle, for example.

Figure 12:
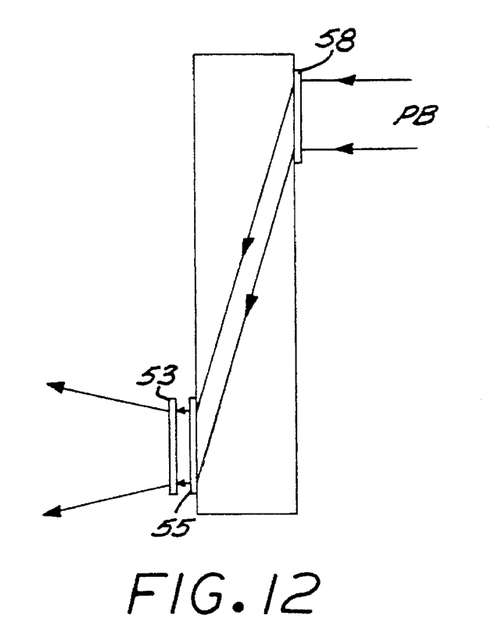
FIG. 12 is a schematic sectional elevational view Illustrating an embodiment of the invention that includes a display transmission hologram, a light bending transmission hologram, and a light coupling transmission hologram.

FIG. 12 sets forth a hologram structure in accordance with the invention that includes the display transmission hologram 53 and the light configuring transmission hologram 55 of the structure of FIG. 11, and a light coupling transmission hologram 58 that diffracts a playback beam PB incident on the non-substrate side thereof at an angle that is near normal, for example, to produce a trapped off-axis playback beam for the light configuring transmission hologram 55.

Hologram structures in accordance with the invention can further be implemented with prisms for coupling the off-axis playback beam for the light configuring hologram into the hologram supporting substrate. Pursuant to such implementation, the display hologram and the light configuring hologram can comprise various combinations of reflection and transmission holograms as described above relative to FIGS. 6, 8, 10, and 12.

Figure 13:
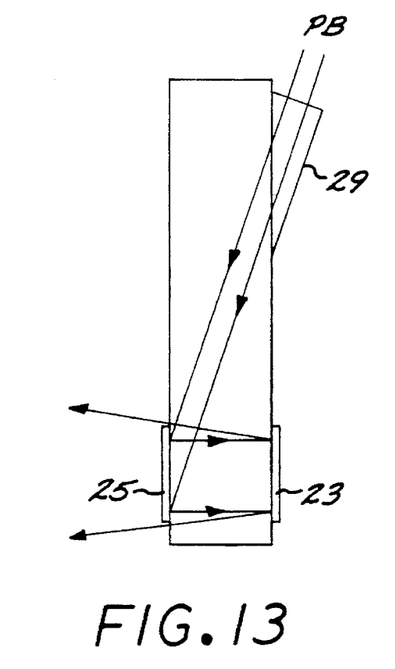
FIG. 13 is a schematic sectional elevational view illustrating an embodiment of the invention that includes a display reflection hologram, a light bending reflection hologram, and a prism for coupling playback illumination into a substrate that supports the holograms.

FIG. 13 in particular illustrates a hologram structure that is similar to the structure of FIG. 6 and includes a display reflection hologram 23 on the non-viewing side of a substrate 21, a light configuring reflection hologram 25 disposed on the viewing side of the substrate, and a prism 29 disposed on the non-viewing side of the substrate for coupling an off-axis playback beam PB into the substrate 21 to provide a trapped off-axis playback beam for the light configuring reflection hologram 25.

Figure 14:
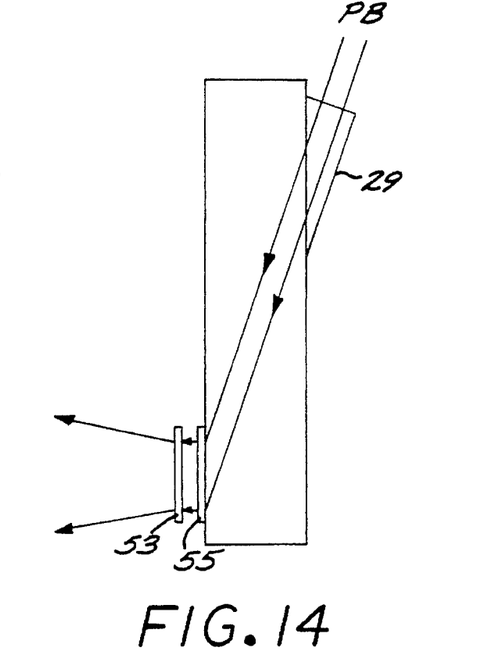
FIG. 14 is a schematic sectional elevational view illustrating an embodiment of the invention that includes a display transmission hologram, a light bending transmission hologram, and a prism for coupling playback illumination into a substrate that supports the holograms.

FIG. 14 in particular illustrates a hologram structure that is similar to the structure of FIG. 12 and includes a light configuring transmission hologram 55 disposed on the viewing side of a substrate, a display transmission hologram 53 disposed on the light configuring hologram 55, and a prism 29 disposed on the non-viewing side of the substrate for coupling an off-axis playback beam PB into the substrate 21 to provide a trapped off-axis playback beam for the light configuring reflection hologram 55.

Figure 15:
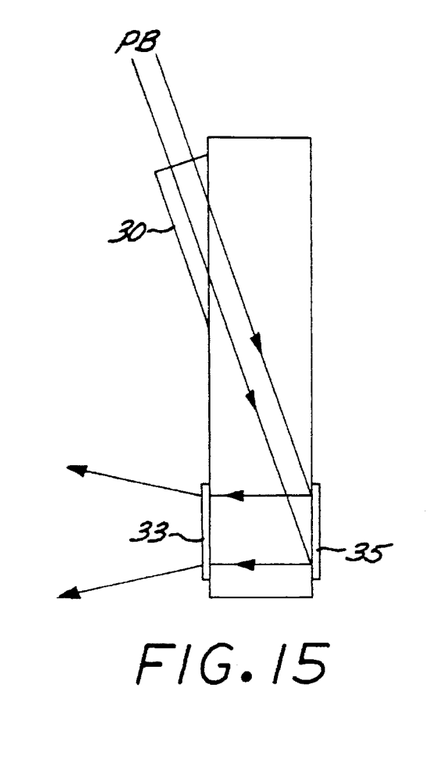
FIG. 15 is a schematic sectional elevational view illustrating an embodiment of the invention that includes a display transmission hologram, a light bending reflection hologram, and a prism for coupling playback illumination into a substrate that supports the holograms.

FIG. 15 in particular illustrates a hologram structure that is similar to the structure of FIG. 8 and includes a display transmission hologram 33 on the viewing side of a substrate 21, a light configuring reflection hologram 35 disposed on the non-viewing side of the substrate, and a prism 30 disposed on the viewing side of the substrate for coupling an off-axis playback beam PB into the substrate 21 to provide a trapped off-axis playback beam for the light configuring reflection hologram 35.

Figure 16:
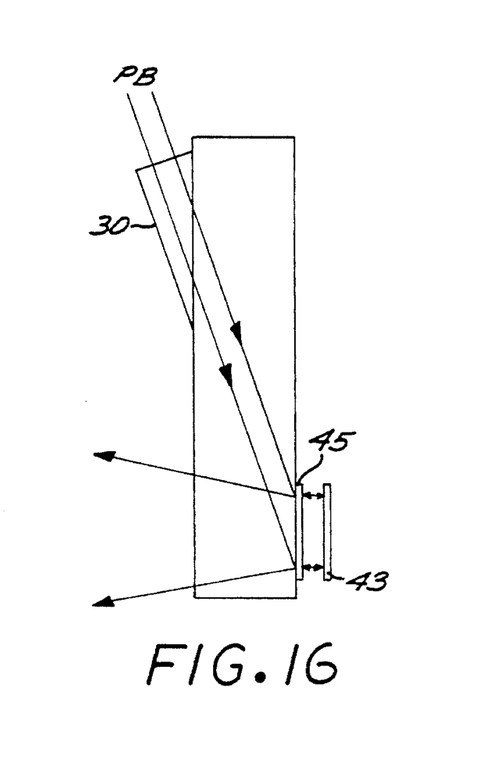
FIG. 16 is a schematic sectional elevational view illustrating an embodiment of the invention that includes a display reflection hologram, a light bending transmission hologram, and a prism for coupling playback illumination into a substrate that supports the holograms.
Figures 17, 18:
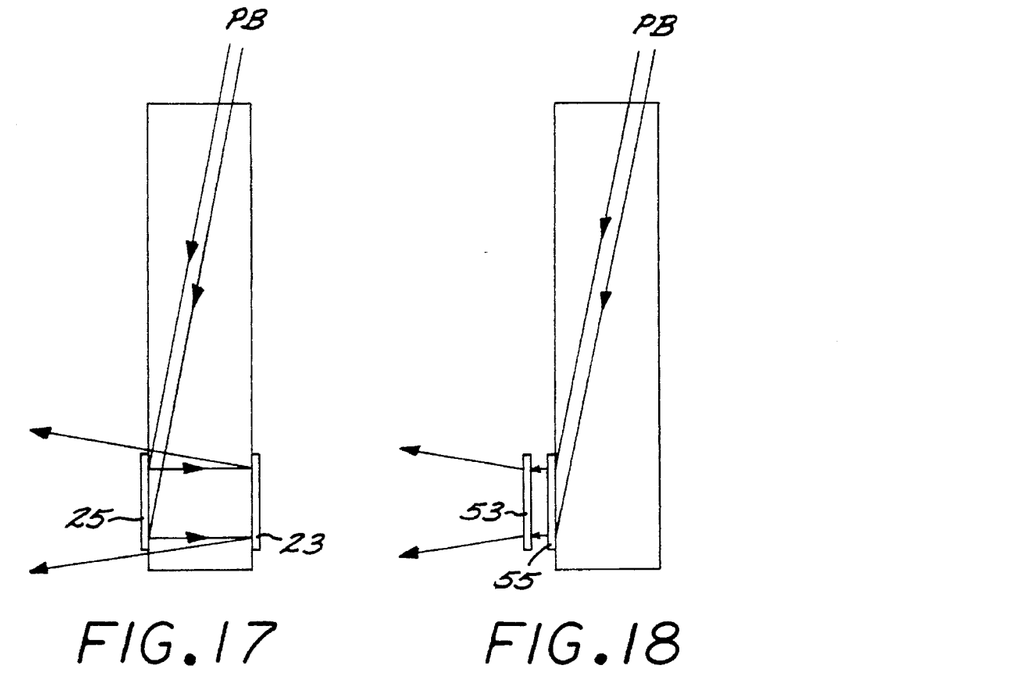
FIG. 17 is a schematic sectional elevational view illustrating an embodiment of the invention that includes a display reflection hologram, a light bending reflection hologram, and playback illumination that is edge coupled into a substrate that supports the holograms.
FIG. 18 is a schematic sectional elevational view illustrating an embodiment of the invention that includes a display transmission hologram, a light bending transmission hologram, and playback illumination that is edge coupled into a substrate that supports the holograms.
Figures 19, 20:
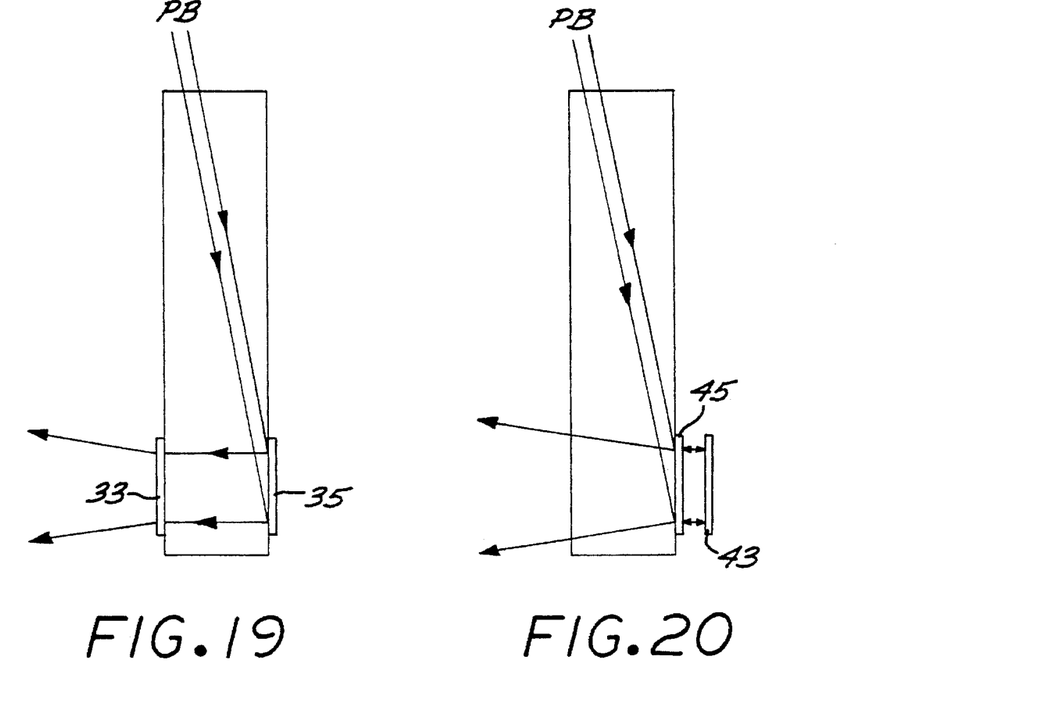
FIG. 19 is a schematic sectional elevational view illustrating an embodiment of the invention that includes a display transmission hologram, a light bending reflection hologram, and playback illumination that is edge coupled into a substrate that supports the holograms.
FIG. 20 is a schematic sectional elevational view illustrating an embodiment of the invention that includes a display reflection hologram, a light bending transmission hologram, and playback illumination that is edge coupled into a substrate that supports the holograms.

FIG. 16 in particular illustrates a hologram structure that is similar to the structure of FIG. 10 and includes a light configuring transmission hologram 45 disposed on the non-viewing side of a substrate 21, a display reflection hologram 43 disposed on the light configuring hologram 45, and a prism 30 disposed on the viewing side of the substrate for coupling an off-axis playback beam PB into the substrate 21 to provide a trapped off-axis playback beam for the light configuring transmission hologram 45.

Hologram structures in accordance with the invention can also be implemented with a trapped off-axis playback beam for the light configuring hologram wherein the trapped beam is edge coupled into a thicker hologram supporting substrate, as illustrated in FIGS. 17–20 wherein the display holograms and the light configuring holograms are of the same types as shown in FIGS. 13–16.

Hologram structures in accordance with the invention can also be implemented with an off-axis playback beam for the light configuring hologram that is not trapped in the hologram supporting substrate. Pursuant to such implementation, the display hologram and the light configuring hologram can comprise various combinations of reflection and transmission holograms.

Figures 21, 22:
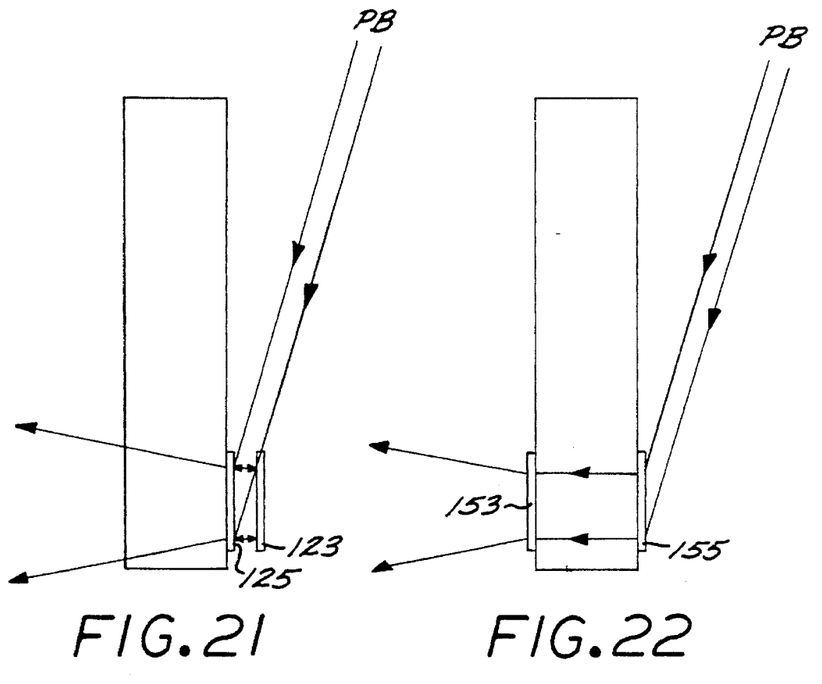
FIG. 21 is a schematic sectional elevational view illustrating an embodiment of the invention that includes a display reflection hologram and a light bending reflection hologram which is illuminated with a non-trapped off axis playback beam.
FIG. 22 is a schematic sectional elevational view illustrating an embodiment of the invention that includes a display transmission hologram and a light bending transmission hologram which is illuminated with a non-trapped off axis playback beam.

FIG. 21 in particular illustrates a hologram structure that includes a light configuring reflection hologram 125 disposed on the non-viewing side of a substrate 21 and a display reflection hologram 123 disposed on the light configuring reflection hologram. The light configuring reflection hologram is illuminated with an off-axis playback beam PB that passes through the display hologram 123 and can comprise for example a collimated beam (as shown) or a diverging beam such as would be provided by flood illumination.

FIG. 22 in particular illustrates a hologram structure that includes a light configuring transmission hologram 155 disposed on the non-viewing side of a substrate 21 and a display transmission hologram 153 disposed the viewing side of the substrate 21 opposite the light configuring transmission hologram 155. The light configuring reflection hologram is illuminated with an off-axis playback beam PB that can comprise for example a collimated beam (as shown) or a diverging beam such as would be provided by flood illumination. It is noted that the structure of FIG. 22 is similar to that of FIG. 2, except as to the nature of the off-axis playback beam shown.

Figure 23:
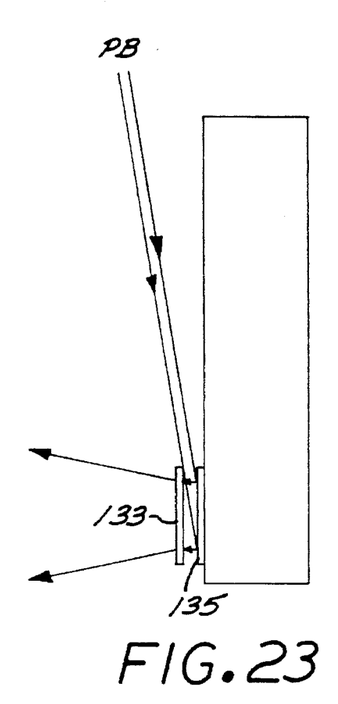
FIG. 23 is a schematic sectional elevational view illustrating an embodiment of the invention that includes a display transmission hologram and a light bending reflection hologram which is illuminated with a non-trapped off axis playback beam.

FIG. 23 in particular illustrates a hologram structure that includes a light configuring reflection hologram 135 disposed on the viewing side of a substrate 21 and a display transmission hologram 133 disposed on the light configuring hologram. The light configuring reflection hologram is illuminated with an off-axis playback beam PB that passes through the display hologram 133 and can comprise for example a collimated beam (as shown) or a diverging beam as would be provided by flood illumination.

Figure 24:
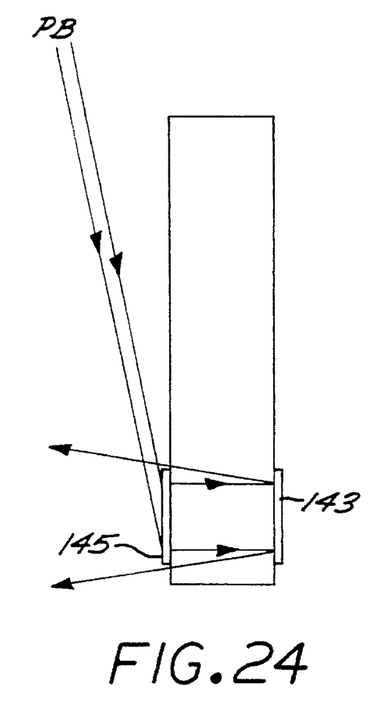
FIG. 24 is a schematic sectional elevational view illustrating an embodiment of the invention that includes a display reflection hologram and a light bending transmission hologram which is illuminated with a non-trapped off axis playback beam.

FIG. 24 in particular illustrates a hologram structure that includes a display reflection hologram 143 disposed on the non-viewing side of a substrate 21 and a light configuring transmission hologram 145 disposed on the viewing side of the substrate 21 opposite the display hologram 143. The light configuring transmission hologram 145 is illuminated with an off-axis playback beam PB that can comprise for example a collimated beam (as shown) or a diverging beam as would be provided by flood illumination. It is noted that the hologram structure of FIG. 24 is similar to the hologram structure of FIG. 1, except as to the nature of the off-axis playback beam shown.

The foregoing has been a disclosure of display hologram structures that allow for improved display of pictorial holograms, and which allow for readily portable hologram display units by virtue of the formation of an optimum playback beam by the light configuring hologram from a non-optimum source of playback illumination.

Although the foregoing has been a description and illustration of specific embodiments of the invention, various modifications and changes thereto can be made by persons skilled in the art without departing from the scope and spirit of the invention as defined by the following claims.

What is claimed is:

1. A display hologram structure comprising:

a substrate having first and second opposing sides;

a light configuring hologram which is a transmission hologram attached to the first side of said substrate; and a display hologram which is a reflection hologram laminarly attached to said light configuring hologram and responsive to playback illumination at an incidence angle that is within 25 degrees of normal;

wherein said light configuring hologram is responsive to a first playback beam for providing playback illumination to said display hologram at an incidence angle that is within 25 degrees of normal relative to said display hologram.

2. The display hologram structure of claim 1 wherein the firs playback beam is a trapped beam in said substrate.

3. The display hologram structure of claim 2 further including a light coupling hologram attached to the second side of said substrate for producing said trapped beam.

4. The display hologram structure of claim 3 wherein said light coupling hologram comprises a transmission hologram.

5. The display hologram structure of claim 3 wherein said light coupling hologram comprises a reflection hologram.

6. A display hologram structure comprising:

a substrate having first and second opposing sides;

a light configuring hologram which is a transmission hologram attached to the first side of said substrate; and a display hologram which is a transmission hologram laminarly attached to said light configuring hologram and responsive to playback illumination at an incidence angle that is within 25 degrees of normal;

wherein said light configuring hologram is responsive to a first playback beam which is a trapped beam in said substrate for providing playback illumination to said display hologram at an incidence angle that is within 25 degrees of normal relative to said display hologram.

7. The display hologram structure of claim 6 further including a light coupling hologram attached to the second side of said substrate for producing said trapped beam.

8. The display hologram structure of claim 7 wherein said light coupling hologram comprising a transmission hologram.

9. The display hologram structure of claim 7 wherein said light-coupling hologram comprises a reflection hologram.

10. A display hologram structure comprising:

a substrate having first and second opposing sides;

a light configuring hologram which is a reflection hologram attached to the first side of said substrate;

a display hologram which is a reflection hologram laminarly attached to said light configuring hologram and responsive to playback illumination at an incidence angle that is within 25 degrees of normal;

wherein said light configuring hologram is responsive to a first playback beam for providing playback illumination to said display hologram at an incidence angle that is within 25 degrees of normal relative to said display hologram.

11. The display hologram structure of claim 10 wherein the first playback beam is a trapped beam in said substrate.

12. The display hologram structure of claim 11 further including a light coupling hologram attached to the second side of said substrate for producing said tapped beam.

13. The display hologram structure of claim 12 wherein said light coupling hologram comprises a transmission hologram.

14. The display hologram structure of claim 12 wherein said light coupling hologram comprises a reflection hologram.

15. A display hologram structure comprising:

a substrate having first and second opposing sides;

a light configuring hologram which is a reflection hologram attached to the first side of said substrate; and a display hologram which is a transmission hologram laminarly attached to said light configuring hologram and responsive to playback illumination at an incidence angle that is within 25 degrees of normal;

wherein said light configuring hologram is responsive to a first playback beam for providing playback illumination to said display hologram at an incidence angle that is within 25 degrees of normal relative to said display hologram.

16. The display hologram structure of claim 15 wherein the first playback beam is a trapped beam in said substrate.

17. The display hologram structure of claim 16 further including a light coupling hologram attached to the second side of said substrate for producing said trapped beam.

18. The display hologram structure of claim 17 wherein said light coupling hologram comprises s transmission hologram.

19. The display hologram structure of claim 17 wherein said light coupling hologram comprises a reflection hologram.

* * * * *